May 6, 1958 R. R. THALNER 2,833,961

CATHODE RAY BEAM DEFLECTION CIRCUIT

Filed Feb. 2, 1956 2 Sheets-Sheet 1

INVENTOR.
Robert R. Thalner
BY
Mason, Kolehmainen, Rathburn & Wyss.
Attys.

CATHODE RAY BEAM DEFLECTION CIRCUIT

Filed Feb. 2, 1956 2 Sheets-Sheet 2

INVENTOR.
Robert R. Thalner
BY
Mason, Kolehmainen, Rathburn & Wyss.
Attys.

United States Patent Office 2,833,961

Patented May 6, 1958

2,833,961

CATHODE RAY BEAM DEFLECTION CIRCUIT

Robert R. Thalner, Buffalo, N. Y., assignor to Sylvania Electric Products Inc., a corporation of Massachusetts Application February 2, 1956, Serial No. 562,969

8 Claims. (Cl. 315—27)

The present invention relates to a cathode ray beam deflection circuit, more particularly, to a combination type deflection circuit which supplies both a beam deflection signal and a high unidirectional beam accelerating potential, and the invention has for a principal object the provision of a combination deflection circuit which is more simple and reliable than those heretofore known in the prior art.

The horizontal scanning amplifier of a conventional television receiver ordinarily supplies a deflection current to a horizontal deflection yoke positioned about the neck of a cathode ray tube image reproducing device, thereby to effect horizontal deflection of the cathode ray beam. The horizontal deflection winding is ordinarily coupled to the horizontal output tube through a transformer which includes a high voltage tertiary winding used to develop high voltage pulses during the horizontal retrace intervals. This pulse wave is supplied to a rectification system which derives therefrom a high unidirectional voltage for use in energizing an accelerating anode of the image reproducing device.

In order to eliminate oscillations in the deflection circuits following each flyback pulse while permitting the derivation of the high unidirectional energizing potential, a suitable damping diode circuit may be connected across the horizontal output transformer. For class B operation, this diode is normally nonconductive during the latter portion of the trace period and is conductive during the retrace period and also during the initial portion of the trace period. With certain types of deflection and high voltage producing circuits, it has been found that the leakage reactance of the horizontal transformer and the associated circuit capacitances form a series resonant circuit which, at the natural frequency thereof, provides a sufficiently low impedance to affect the operation of the damping diode so that it becomes intermittently nonconductive during the trace interval. As a result, the current in the scanning yoke is rendered nonlinear and objectional bright vertical lines are produced on the screen of the cathode ray tube.

Accordingly, another object of the present invention is to provide a new and improved cathode ray beam deflection circuit for a television picture tube wherein sustained oscillations in the high unidirectional voltage developing circuit are effectively eliminated.

A further object of the present invention is to provide a new and improved, simplified and yet reliable cathode ray beam deflection circuit in which ringing oscillations normally developed in the high voltage rectifier circuit are eliminated.

Briefly, in accordance with the present invention, the above and further objects are realized by providing a scanning signal amplifier and high voltage supply circuit which includes a horizontal output amplifier having an input circuit connected to be supplied with a scanning signal. The output of the horizontal output amplifier is coupled through an output transformer to a suitable deflection scanning yoke, and a tertiary winding on the same transformer is provided for the development of a high unidirectional voltage in response to the flyback pulse which appears in the principal transformer winding when the horizontal output amplifier is cut off. A damping diode is connected across the deflection signal output terminals of the transformer and operates to supply the initial portion of the sweep signal and to eliminate the deflection circuit oscillatory currents which would ordinarily flow in the deflection apparatus following the retrace pulse. Ringing oscillations are eliminated by means of a resonant circuit, preferably in the form of a tank circuit, which is included in the high voltage rectifier circuit to provide a high attenuating impedance only in the vicinity of those frequencies at which the ringing oscillations occur.

The invention, both as to its organization and method of operation, together with further objects and advantages thereof will best be understood by reference to the following detailed description taken in connection with the accompanying drawings in which.

Figure 1:
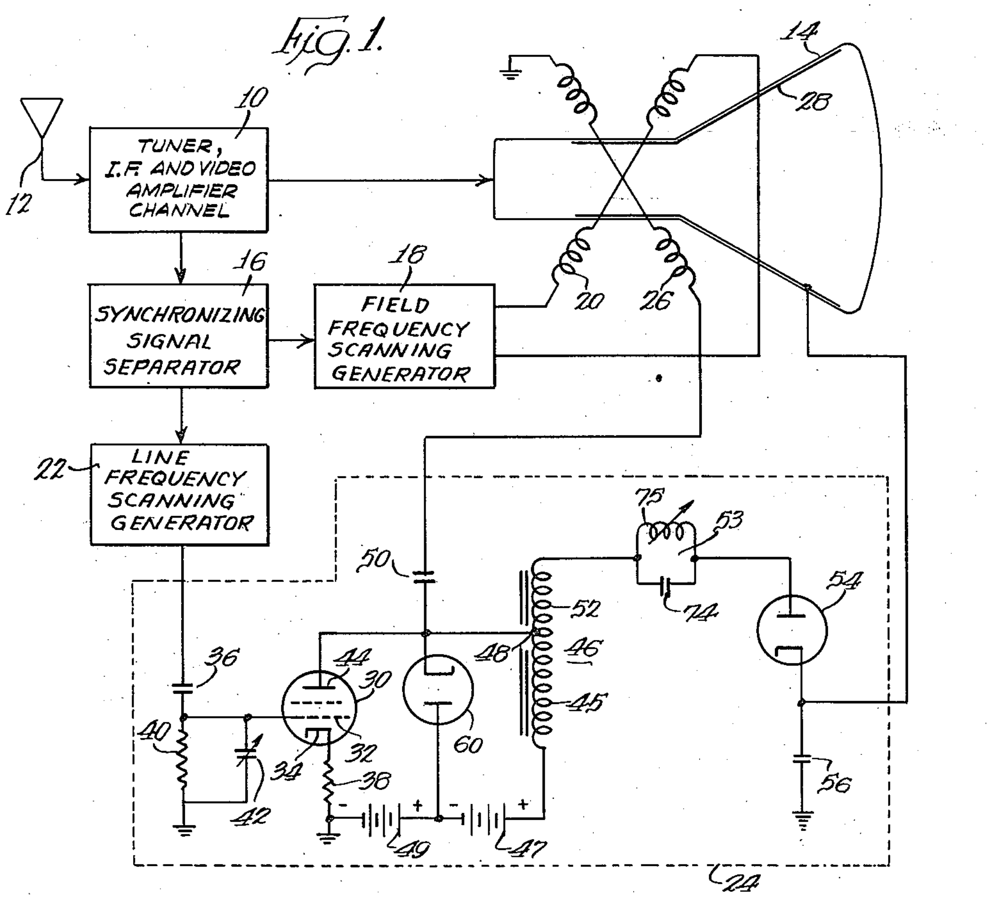
Fig. 1 is a schematic circuit diagram of a television receiver embodying the combination high voltage and horizontal deflection circuit of the present invention.

Referring now to the drawing and more particularly to Fig. 1 thereof, the television receiver includes a video signal channel 10 having an input circuit coupled to a conventional antenna 12 and an output circuit coupled to the intensity control electrodes of a cathode ray tube type of image reproducer 14. Unit 10 is conventional and includes a high frequency amplifier, a video detector, and a video amplifier, the picture signal which is developed in the output circuit of the video detector being applied to a synchronizing signal separator 16 wherein the synchronizing signal components of the picture signal are separated from each other and from the video components of the received wave. The vertical synchronizing components are supplied to control the synchronized operation of a field frequency scanning generator 18. The output circuit of the generator 18 is connected to a vertical deflection winding 20 of a scanning yoke positioned in the conventional manner about the neck of the image reproducing device 14. The horizontal synchronizing components, separated from the television signal by the synchronizing signal generator 16, are similarly applied to a line frequency scanning generator 22 to control the synchronized operation thereof. The unit 22 is conventional and the output circuit thereof is coupled to a line scanning amplifier and high voltage supply 24. The scan output circuit of the unit 24 is coupled to a horizontal scanning winding 26 of the deflection yoke and the high voltage output circuit of the unit 24 is coupled to the accelerating anode 28 of the image reproducer 14.

With the exception of the scanning amplifier and high voltage supply 24, the construction and operation of the television receiver thus far described is conventional in that a television signal received by the antenna 12 is supplied to the unit 10 where it is amplified, detected, and again amplified after detection and before being used to control the intensity of the cathode ray beam of the image reproducing beam 14. The vertical and horizontal synchronizing components of the received signal are separated by the separator 16 and are applied to the scanning system 18 and to a source of horizontal scanning signals 22 to control the synchronized operations thereof. The vertical scanning signal is supplied from the output circuit of the unit 18 to the vertical scanning winding 20 and the horizontal scanning signal is supplied to the horizontal scanning winding 26 through the unit 24 from the line frequency scanning generator 22 thereby to cause the cathode ray beam of the tube 14 to trace a raster of horizontal lines on the screen of the tube 14.

Referring now more particularly to the portion of the receiver of Fig. 1 embodying the present invention, the unit 24 includes a horizontal sweep voltage amplifier tube 30 having an input circuit including a control electrode 32 and a cathode 34, the electrode 32 being connected through a capacitor 36 to the output circuit of the line-frequency scanning generator 22. The cathode 34 is connected to ground through a resistor 38, and a grid leak resistor 40 is connected between the control electrode 32 and ground. The amplitude of the scanning signal applied from the generator 22 to the input electrodes of the discharge device 30 may be adjusted by means of a variable capacitor 42 which is connected in parallel with the resistor 40 thereby to control the width of the image reproduced on the screen of the picture tube 14. The amplifier tube 30 also includes an anode 44 which is coupled through a winding 45 of an output transformer 46 to a source of power energization voltage indicated as the series connected batteries 47 and 49.

In the embodiment of the invention illustrated, the transformer 46 is of the auto-transformer type and the output is taken across the winding 45 at a tap 48 thereon which coincides with the point at which the output scanning wave from the amplifier 30 is supplied to the transformer 46. Accordingly, the signal appearing at the tap 48 is capacitively coupled through a capacitor 50 to the horizontal scanning winding 26 to scan the cathode ray beam of the tube 14 in the usual manner. The transformer 46 also includes a conventional high voltage tertiary winding 52 which is connected to ground through the series connection of a parallel resonant or tank circuit 53, a high voltage rectifier 54 and a filtering capacitor 56. A high unidirectional accelerating voltage is thus derived across the capacitor 56 and supplied to the accelerating anode 28 of the image reproducing discharge device 14 to provide an energizing potential therefor.

A conventional class B damping and efficiency diode circuit is provided and includes a diode rectifier 60 which is connected to the junction of the batteries 47 and 49 and which is so poled as to conduct conventional current from the battery 49 to the anode 44. It will be appreciated that because an autotransformer is used to couple the scanning signal from the discharge device 32 to the horizontal deflection winding 26, the diode 16 is effectively coupled in the output circuit of the transformer 46.

Figure 2:
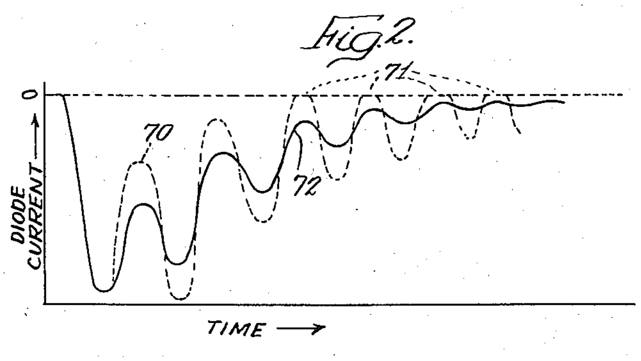
Fig. 2 is a graph representing certain operating conditions of the damping diode of the circuit arrangement of Fig. 1 and is used as an aid in explaining the operation of the present invention.

Considering now the operation of the scanning amplifier and high voltage supply as thus far described, the scanning voltage signal which is applied to the input electrode of the discharge device 30 causes the device 30 to conduct during the last half of the trace portion of the scanning signal and to be nonconductive during the retrace portion and during the first half of the trace portion. As is well known in the art, in order to return the cathode ray beam to the left-hand edge of the viewing screen at the end of the trace interval, the amplifier 30 is cut off and a high reverse polarity pulse is developed in the transformer 46. This high voltage pulse which occurs when the amplifier 30 is cut off is also utilized in the tertiary winding 52 to develop a high positive pulse of voltage across the capacitor 56 which provides the high cathode ray beam accelerating potential necessary for the proper operation of the tube 14. Moreover, when the horizontal output tube 30 is cut off during the trace period, the damping diode 60 conducts and places a low impedance across the primary winding 45 of the transformer 46. If unity coupling is achieved between the windings 45 and 52, the impedance of the diode 60 also damps out any oscillations which might occur in the windings 52. However, as a practical matter there is always some leakage reactance in the transformer 46 which forms a series resonant circuit with the capacitance to ground of the diode rectifier 54 and with any distributed capacitance to ground of the winding 52. These series resonant circuits have a very low impedance at resonance so that in prior art circuits oscillations developed in the winding 52 at the resonant frequency are effectively undamped and when superimposed on the normal current flowing in the diode 60 intermittently reduce the damping diode current to zero, thus overcoming the shunting or current regulating effect of the diode 60 and directly affecting the scanning current in the coils 26. As a result, in the prior art circuits the linearity of the horizontal scanning current is destroyed and objectional bright lines are produced in the raster corresponding to those periods when the diode 60 is cut off by the superimposed oscillations arising in the high voltage circuit. Referring to Fig. 2, the oscillations shown by the dotted lines designated as 70 may be of sufficient amplitude that the diode is intermittently cut off and during these non-conducting periods 71 the current in the coils 26 becomes nonlinear.

In order to prevent the existence of high frequency ringing oscillations in the high voltage circuit, there is provided in accordance with the present invention the resonant tank circuit 53 which includes a capacitor 74 and a variable inductor 75 connected in parallel. The circuit 53 may be tuned by adjustment of the inductor 75 to be resonant at the ringing frequency of the heretofore mentioned series resonant circuit so that the frequency at which the series resonant circuit which includes the tertiary winding 52 and the capacitor 56 is very low, the impedance of the resonant circuit 53 is very high. As a result, at the normal ringing frequency of the system, the low impedance of the series resonant circuit is counterbalanced by the high impedance of the parallel resonant circuit 53 which is serially connected therewith. Consequently, ringing oscillations are effectively eliminated. Moreover, because the flyback frequency is far removed from the normal ringing frequency, which is about two hundred kilocycles, the tank circuit has no appreciable adverse effect on the development of the high polarized voltage for energizing the second anode 28.

Referring to Fig. 2, the curve 72 is representative of the current flowing in the damping diode 60 immediately following the time that the amplifier 30 is cut off. Because of the action of the tank circuit 53 effectively to eliminate the ringing oscillations in the high voltage rectifier circuit, the amplitude of the oscillations superimposed in the diode current is greatly decreased and the diode current approaches zero without being intermittently cut off. Consequently, the horizontal deflection current is linear.

Figure 3:
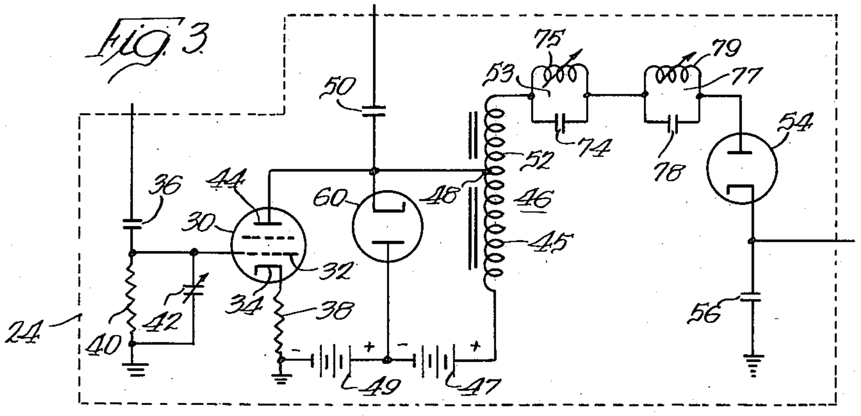
Figs. 3, 4 and 5 are alternative embodiments of the present invention.

Referring now to Fig. 3, there is shown another embodiment of the invention in which an additional tank circuit is provided in the anode circuit of the high voltage rectifier 54 so that oscillations which might occur at a harmonic of the ringing frequency may also be eliminated. Since the circuit is primarily the same as the circuit 24 shown in Fig. 1, similar parts have been designated with like numerals.

In accordance with the aspect of the invention shown in Fig. 3, an adjustable tank circuit 77 is provided in addition to the tuned circuit 53 and includes a capacitor 78 and an adjustable inductor 79. The tank circuit 53 and the tank circuit 77 are serially connected between the anode of the high voltage rectifier 54 and the upper terminal of the tertiary winding 52. The ringing oscillations in the high voltage output circuit may and usually do occur at a number of frequencies, the principal oscillations occurring at the resonant frequency of the heretofore mentioned resonant series circuit and at the second harmonic of this frequency. Accordingly, the tank circuit 77 and the tank circuit 53 are respectively tuned to the fundamental ringing frequency and to the second harmonic thereof. The utilization of two tank circuits thus eliminates from the output transformer 45 and associated circuits both the fundamental ringing frequency and the second harmonic thereof so that the efficiency of operation of the unit 24 and of the entire television receiver is greatly increased.

Although only one additional tank circuit is illustrated in Fig. 3 as being serially connected in the high voltage rectifier circuit, it will be understood that more tank circuits may be provided if necessary to suppress any additional harmonic oscillations.

Figure 4:
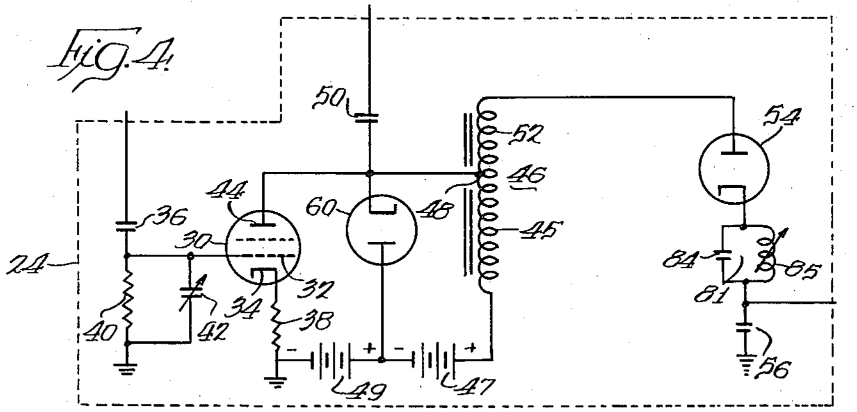

Referring now to Fig. 4, there is shown a further embodiment of the invention wherein an adjustable tank circuit 81, including a capacitor 84 and an adjustable inductor 85, is connected between the cathode of the high voltage diode 54 and the filter capacitor 56. The operation of this circuit is similar to the operation of the circuit of Fig. 1 since the tank circuit 81 is preferably tuned to the fundamental ringing frequency of the series resonant high voltage circuit and is used to counterbalance the low impedance provided by the series resonant circuit of the winding 52 and the capacitor 56 at the ringing frequency.

Figure 5:
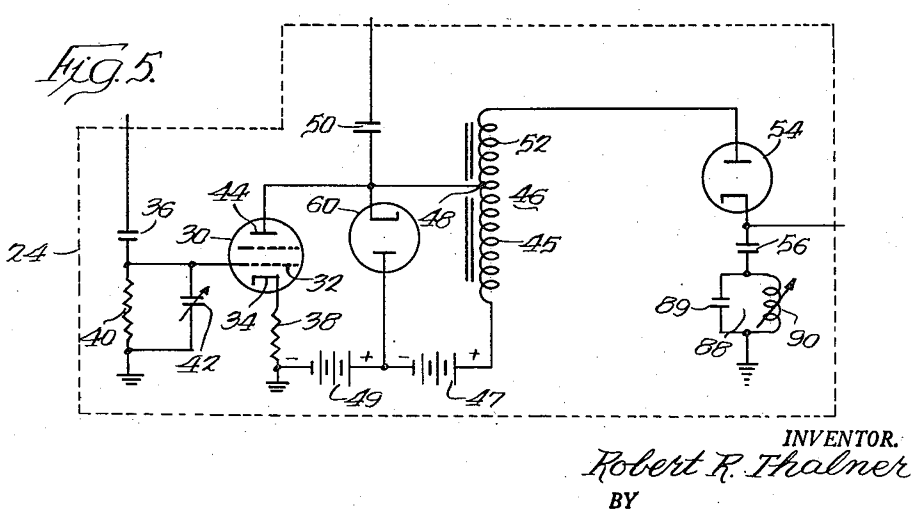

Referring to Fig. 5, there is shown still another embodiment of the invention wherein an adjustable tank circuit 88, which includes a capacitor 89 and an adjustable inductor 90, is connected between ground and the capacitor 56. The tank circuit 88 is preferably tuned to the fundamental ringing frequency of the output circuit.

It may thus be seen that a highly efficient horizontal deflection and high voltage circuit is provided in accordance with the present invention since the tank circuits which are connected in the high voltage rectifier circuit eliminate ringing while at the same time present a relatively low impedance at frequencies appreciably removed from the resonant frequency thereof. If desired, the tank circuits so provided may be of the high Q type so as to provide a minimum of impedance at frequencies removed from the ringing frequency, but it has been found that satisfactory operation is achieved with relatively low Q circuits, as long as the impedance of the tank circuit at resonance exceeds by a substantial amount the impedance of the ringing circuit at resonance.

While there has been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. A scanning signal amplifier and high voltage supply comprising, means for producing a signal of scanning voltage waveform, means for developing a magnetic scanning field in response to said signal, said last mentioned means including a transformer having an input and an output circuit, a rectification system responsive to a signal from said output circuit to derive a high unidirectional voltage, and parallel resonant impedance means serially connected in said rectification system, said impedance means being resonant at the ringing frequency of said scanning signal amplifier and high voltage supply.

2. The circuit of claim 1 wherein said impedance means is a tank circuit.

3. The circuit of claim 1 wherein said rectification system includes a diode type rectifier and said impedance means includes a tank circuit interconnected between said transformer and said rectifier.

4. The circuit of claim 1 where said impedance means includes a plurality of tank circuits respectively tuned to different frequencies including said ringing frequency and at least one harmonic thereof.

5. A combined deflection and high voltage circuit comprising, a source of deflection voltage, an amplifier for amplifying said deflection voltage, means for coupling the amplified deflection voltage from said amplifier to a utilization means, a transformer connected to be energized by said amplified deflection voltage, a rectifier connected so as to polarize an output voltage from said transformer, a capacitor serially connected with said rectifier and across which the polarized voltage is developed, and an adjustable tank circuit serially connected with said rectifier and said capacitor to a winding of said transformer.

6. A combination deflection high voltage circuit comprising, a source of deflection voltage, an amplifier including a discharge device for amplifying said deflection voltage, means for coupling said deflection voltage from said amplifier to the deflection coils of a television picture tube, an auto-transformer connected to be energized by said amplified deflection voltage, a tertiary winding on said transformer, a diode rectifier, a first capacitor, said capacitor and said diode rectifier being serially connected between ground and said tertiary winding and a parallel tuned circuit including an inductor and a second capacitor connected between said diode rectifier and said tertiary winding, said tuned circuit being resonant at the resonant frequency of the circuit comprising the inductance of said tertiary winding and the combined capacitance value of said rectifier and said first capacitor.

7. A combination deflection high voltage circuit comprising, a source of deflection voltage, an amplifier including a discharge device for amplifying said deflection voltage, means for coupling said deflection voltage from said amplifier to the deflection coils of a television picture tube, an auto-transformer connected to be energized by said amplified deflection voltage, a tertiary winding on said transformer, a diode rectifier, a first capacitor, said capacitor and said diode rectifier being serially connected between ground and said tertiary winding and a parallel tuned circuit including an inductor and a second capacitor connected between said diode rectifier and said first capacitor, said tuned circuit being resonant at the resonant frequency of the circuit comprising the inductance of said tertiary winding and the capacitance value of said rectifier and said first capacitor.

8. A combination deflection high voltage circuit comprising, a source of deflection voltage, an amplifier including a discharge device for amplifying said deflection voltage, means for coupling said deflection voltage from said amplifier to the deflection coils of a television picture tube, an auto-transformer connected to be energized by said amplified deflection voltage, a tertiary winding on said transformer, a diode rectifier, a capacitor, said capacitor and said diode rectifier being serially connected between ground and said tertiary winding and a parallel tuned circuit including an inductor and capacitor serially connected with said diode rectifier and said tertiary winding, said tuned circuit being resonant at the resonant frequency of the circuit comprising the inductance of said tertiary winding and the capacitance value of said rectifier and said capacitor.

References Cited in the file of this patent

UNITED STATES PATENTS

| | | |
|---|---|---|
| 2,599,798 | Wissel | June 10, 1952 |
| 2,751,520 | Nelson | June 19, 1956 |